US009609194B2

(12) United States Patent
Egger et al.

(10) Patent No.: US 9,609,194 B2
(45) Date of Patent: Mar. 28, 2017

(54) CAMERA AND METHOD FOR THE DETECTION OF OBJECTS

(71) Applicant: SICK AG, Waldkirch (DE)

(72) Inventors: Christoph Egger, Waldkirch (DE); Richard Nopper, Waldkirch (DE); Jurgen Reichenbach, Waldkirch (DE)

(73) Assignee: SICK AG, Waldkirch (DE)

( * ) Notice: Subject to any disclaimer, the term of this patent is extended or adjusted under 35 U.S.C. 154(b) by 25 days.

(21) Appl. No.: 14/921,052

(22) Filed: Oct. 23, 2015

(65) Prior Publication Data
US 2016/0119523 A1  Apr. 28, 2016

(30) Foreign Application Priority Data

Oct. 24, 2014 (DE) .................. 10 2014 115 540

(51) Int. Cl.
H04N 5/225 (2006.01)
G06K 9/20 (2006.01)
(Continued)

(52) U.S. Cl.
CPC .............. *H04N 5/2256* (2013.01); *G01J 3/10* (2013.01); *G01J 3/2803* (2013.01); *G06K 9/2018* (2013.01); *G06K 9/2027* (2013.01)

(58) Field of Classification Search
CPC ........ H04N 5/2256; G01J 3/10; G01J 3/2803; G06K 9/2027; G06K 9/2018
See application file for complete search history.

(56) References Cited

U.S. PATENT DOCUMENTS 5,528,359 A * 6/1996 Taguchi ................ G01N 21/88
356/237.6
5,786,582 A  7/1998 Roustaei et al.
(Continued)

FOREIGN PATENT DOCUMENTS

DE    10122313 A1    11/2002
DE    10234431 A1    2/2004
(Continued)

OTHER PUBLICATIONS

Carver, et al., "A New Dual Band Line Scan Camera for Rapid Inspection", Princeton Lightwave.
(Continued)

Primary Examiner — Twyler Haskins
Assistant Examiner — Angel L Garces-Rivera
(74) Attorney, Agent, or Firm — Nath, Goldberg & Meyer; Jerald L. Meyer

(57) ABSTRACT

A camera (10) for the detection of objects (30) in a detection region (16) is provided which has a light receiver (22) having a plurality of light reception pixels, a multispectral illumination unit (12) for illuminating the detection region (16) in different spectral bands and an evaluation unit (24) that is configured to illuminate the detection region (16) by means of the illumination unit (12) during different illumination windows of time (30a-c) in a respectively different spectral band and to record image data from the detection region (16) by means of the light receiver (22) in recording windows of time (40a-c, 42a-c). In this respect, the light receiver (22) is configured as a two-line receiver having a first line (22a) of light reception pixels and a second line (22b) of light reception pixels and the recording window of time (40a-c, 42a-c) for the first line (22a) is different from that for the second line (22b).

13 Claims, 3 Drawing Sheets

Figure 1:
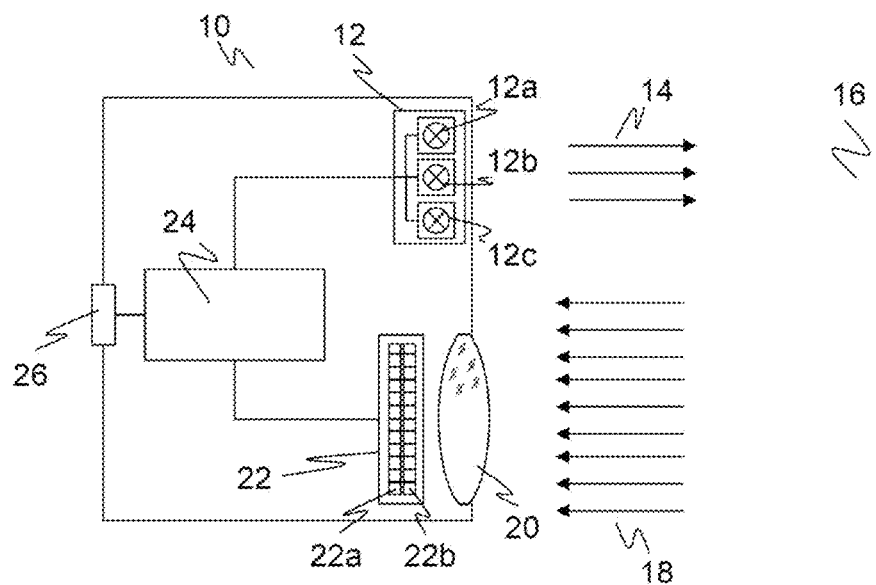

(51) Int. Cl.
G01J 3/10 (2006.01)
G01J 3/28 (2006.01)

(56) References Cited

U.S. PATENT DOCUMENTS

| | | |
|---|---|---|
| 6,088,470 A | 7/2000 | Camus et al. |
| 2006/0113386 A1 | 6/2006 | Olmstead |
| 2014/0364690 A1* | 12/2014 | Seto .................. G02B 23/2461 600/109 |

FOREIGN PATENT DOCUMENTS

| | | |
|---|---|---|
| DE | 202009009493 U1 | 10/2009 |
| DE | 102008016766 A1 | 11/2009 |

OTHER PUBLICATIONS

Carver, et al., "A fiber grating based distributed light source", Proc. of SPIE, vol. 63710H, 2006.
Carstensen, "Multispectral imaging offers new tools", Vision Sytems Design, vol. 12, Issue 3, 2007.
German office action regarding DE102014115540.8 received Jul. 27, 2015.

* cited by examiner

CAMERA AND METHOD FOR THE DETECTION OF OBJECTS

The invention relates to a camera for the detection of objects in a detection region, the camera comprising a light receiver having a plurality of light reception pixels, a multispectral illumination unit for illuminating the detection region in different spectral bands and an evaluation unit that is configured to illuminate the detection region by means of the illumination unit during different illumination windows of time with a respectively different spectral band and to record image data from the detection region with the light receiver in recording windows of time. The invention further relates to a method for the detection of objects.

Having regard to industrial applications cameras are used in a plethora of ways in order to automatically detect object properties, for example, for the inspection or measurement of objects. In this connection images of the object are recorded and are evaluated in accordance with their task by means of image processing methods. A further application of cameras is the reading of codes. Such camera-based code readers are increasingly taking over from the still widely used barcode scanner. With the aid of an image sensor, objects having the codes present thereon are recorded. The code regions are identified in the images and are then decoded. Camera-based code readers can without further ado also process other kinds of code types other than one dimensional line codes, the other code types being constructed as a matrix code also in two dimensions and make available more information. Also the automatic text recognition of printed addresses (OCR, Optical Character Recognition) or of handwriting is in principle a reading of codes. Typical fields of applications of code readers are supermarket cash desks, automated package identification, sorting of post, luggage handling in airports and other logistical applications.

A frequent situation of detection is the assembly of the camera above a conveyor belt. During the relative movement of an object flow on the conveyor belt the camera records images and induces further processing steps in dependence on the obtained object properties. Such processing steps, for example, consist of further processing at a machine adapted to the specific object, the further processing influencing the conveyed object; or in a change of the object flow in that certain objects are excluded from the object flow in the frame work of a quality control; or the object flow is sorted into a plurality of part object flows. When the camera is a camera-based code reader, the objects are identified for a correct sorting or for similar processing steps with reference to the attached codes.

Some object structures can only be recognized rich in contrast on illumination with certain spectral properties. This is in particular true for the reading of colored codes on colored objects with an image processing system. For this purpose color cameras can be used. They use a light source having a wide spectral distribution and color filters are present in front of the camera pixels which respectively only let pass a certain spectral portion of the reception light path. The spatial distribution of these filters defines the camera resolution for the individual spectral components. Having regard to matrix sensors the Bayer pattern is widely used in which the primary colors red, green and blue are arranged at a ratio of 1:2:1 in the manner of a chessboard.

Having regard to line cameras many different paths are chosen. A possibility consists therein of using three lines respectively with a color filter for red, green and blue. Alternatively also an alternating pattern of the color filter can be used within a line. Also dual line sensors exist in which the chess-like Bayer pattern can be realized.

Precisely for the reading of codes, it is, however, not necessary to specify the spectral absolute values, but rather a high grey value contrast is important. The color filters however absorb a noticeable portion of the light energy, this means they have a worse optical degree of efficiency. Moreover, the color filters reduce the spatial resolution significantly, as only a portion of the complete pixels is made available per primary color. The production of image sensors with color filters requires additional working steps with increased manufacturing costs and in this connection the arrangement is determined by means of the filter structure and can no longer be flexibly adapted to the specific situation of detection.

From the DE 20 2009 003 493 U1 a camera-based code reader is known that can change the color of its illumination in order to use a frequency spectrum depending on the code and the code background that leads to an as high as possible contrast. The system is then however fixed to the reading of this one frequency spectrum found for the fixed colors. However, a frequency spectrum is frequently not sufficient in order to ideally detect all image features which becomes particularly evident in the example of simultaneously detected codes on objects of different color.

The DE 10 2008 016 766 A1 discloses a safety camera having a monochromatic image sensor and an illumination switchable in its color. For one evaluation respectively two images are recorded at different illumination or a switch of the illumination takes place when the contrast is not sufficient. Also in this regard the problem exists that different illumination scenarios can indeed be considered, however, only displaced in time. Having regard to highly dynamic sceneries, only one image with fixed illumination is then in turn made available. This is also true for the situation of a high speed line camera at a conveyor belt, where following the switching of the illumination, only the next image line of the next section of an object conveyed further can be recorded.

For this reason, it is an object of the invention to improve the detection of object structures on consideration of their spectral properties.

This object is respectively satisfied by a camera for the detection of objects in a detection region, the camera comprising a light receiver having a plurality of light reception pixels, a multispectral illumination unit for illuminating the detection region in different spectral bands and an evaluation unit that is configured to illuminate the detection region by means of the illumination unit during different illumination windows of time with a respectively different spectral band and to record image data from the detection region with the light receiver in recording windows of time. The light receiver is configured as a dual line receiver having a first line of light reception pixels and a second line of light reception pixels and in that the recording window of time for the first line is different from that for the second line.

The invention starts from the basic idea of configuring a light receiver as a dual line receiver. Although similar effects could also be achieved with two image sensors or two pixel groups, in particular lines of a matrix chip, a light receiver of precisely two pixel lines is meant in this way (dual line camera). This dual line receiver records the image data twice by means of different recording windows of time of its two lines of light reception pixels, but for different illumination of a multispectral illumination.

The camera switches the multispectral illumination sequentially between a plurality of transmitted spectral bands. By means of a control of illumination and light receiver initially independent illumination windows of time and recording windows of time can be determined in which the scenery can be illuminated with a certain spectral band respectively image data can be detected from the scenery. Recording windows of time can in this way completely or partly include one or more illumination windows of time and in this respect can also be interrupted. The recording windows of time are preferably synchronized with the illumination windows of time, but are generally coordinated in the sense of time with respect to one another and, as already explained, and not necessarily in the sense of at the same time or of equal length.

The invention has the advantage that through the coordinated behavior in time of light receiver and illumination, a respective own illumination spectrum can be selected with the lines of the dual line receiver. In this respect the recording conditions are nearly identical apart from the desired variation of the illumination in such a way that the same image data is practically double for the further evaluation, but are present in different spectral regions for an improved differentiation of contrast on illumination. The line transfer of the dual line receiver enables simultaneous illumination and reading out and the effective image rate can be maintained. In contrast to the initially described common use of color filters in front of the light receiver the light energy is used in an ideal way and a very good signal to noise ratio results. The transition to different color combinations respectively to spectral recording conditions is simplified significantly, as the light receiver does not require any fixed color filter. Also the loss of spatial resolution inherent with the color filters is avoided.

The illumination unit is preferably configured for the illumination with at least two of the following spectral bands: red, green, blue, visible, infrared, ultraviolet. A preferred combination are three spectral bands in the primary colors red, green and blue of the visible spectrum. Other combinations for example comprise the visible light in a spectral band in addition to infrared or ultraviolet. The listing of the spectral bands and combinations is not conclusive. For example, also broader spectral bands are plausible that comprise a plurality of colors or, for example, comprise the visible and infrared spectrum.

The evaluation unit is preferably configured for the purpose of cyclically changing the spectral band of the illumination unit. This can also be achieved by a pulsed mode of operation. An example for a cyclic change is the regular tuning of the possible spectral bands, this means that for two spectral bands these are simply changed, for three or more spectral bands a corresponding periodic alternation is utilized.

The evaluation unit is preferably configured for the purpose of a permutation of the sequence of the spectral bands generated by the illumination unit in at least a few cycles. The change of the spectral bands in this manner of consideration forms a kind of stacked dual cycle. In shorter cycles each spectral band is used once; however, a permutation of the sequence is carried out in the respectively next shorter cycle. Following a plurality of these short cycles the whole process is completed periodically in longer cycles. In this way the cyclic change of the spectral band deviates specifically from a simple regular tuning. This serves the purpose that certain spectral bands can be used in certain cycles at certain points in time or following one another and in this way simplifies the determination of suitable recording windows of time.

The evaluation unit is preferably configured for the purpose of determining the recording window of time of at least one line respectively within one illumination window of time in such a way that a recording respectively takes place during the illumination with only one spectral band. The recording window of time is at most as long as the illumination window of time, whereby one recording arises precisely during the corresponding illumination. The recording window of time is preferably displaced from recording to recording in such a way that it respectively lies in a different illumination window of time with an alternating spectral band.

The evaluation unit is alternatively configured for the purpose of determining the recording window of time for at least one line respectively via two illumination windows of time in such a way that a recording first takes place with one spectral band and then with a different spectral band during the illumination. In the recording window of time an illumination is thus carried out with illumination having two different spectral bands and in this way spectral bands are combined. For this purpose, the recording window of time preferably lies at the transition between two illumination windows of time. However, it is also plausible to provide a multipart recording window of time which is intermittently closed during illumination with at least one further spectral band that is not to be detected.

The evaluation unit is preferably configured for the purpose of determining the recording window of time for the other line in such a way that a recording respectively takes place during the illumination with all spectral bands. While the one line thus detects light in one spectral band or the combination of two spectral bands, as was explained in the two previous paragraphs, the other line records light in all of the used spectral bands. When, for example, the illumination is cyclically changed between the primary colors red, green and blue, an image practically arises under white light, as the recording window of time of the other line remains open up until an illumination has been provided for all colors. Intermediate interruptions for the avoidance of an overexposure in at least one spectral range are in this connection possible.

The evaluation unit is preferably configured for the purpose of adding the two lines with respect to one another or for subtracting the two image data from the two lines from one another. Thereby, colors can be combined and reconstructed. If, for example, the one line respectively records combinations of two primary colors and the other line records all colors, then the primary color complementary to the two primary colors can be reconstructed by means of subtraction.

The evaluation unit is preferably configured for the purpose of adapting the length of the illumination window of time and/or the recording window of time in dependence on the spectral sensitivity of the light receiver for the respectively detected spectral bands. The adaptation of the sensitivity of the light receiver should in this connection explicitly also include an adaptation with respect to the objective or the evaluation, for example a targeted over-pronunciation of green in analogy to a Bayer pattern. In this way it can be achieved that image data of like brightness can be recorded in all spectral bands, or that one can targetly deviate therefrom in order to take into consideration certain spectral properties of the structures to be detected. The adaptation takes place in the framework of the installation, maintenance or dynamically during the operation.

The camera preferably has a spectrometer unit in order to measure the intensity of the transmitted or received light in the spectral bands, wherein the evaluation unit is configured for the purpose of adapting a transmission power, a receiving amplification, the length of the illumination window of time and/or the length of the recording window of time in dependence on the measured intensity. The spectrometer thus measures the actual and not only the theoretical spectral properties of illumination and/or recording in order to carry out adaptations such as for example a compensation of non-linear characteristics or thermal effects. The spectrometer unit can be installed in the camera or can be connected externally. It is alternatively plausible to only use a spectrometer during the installation or maintenance and to correspondingly parameterize the camera.

The camera is preferably a camera-based code reader whose evaluation unit is configured for the detection and reading of codes in the image data. This code reader can use the improved spectral detection in order to, for example, carry out a plurality of reading attempts on the basis of the image data from the two lines which respectively draw on contrast rich image data for the reading attempt or calculate the image data of the two lines in advance for the increase of contrast with respect to one another.

In a further aspect the present invention relates to method for the detection of objects in a detection region, in which the detection region is illuminated during different illumination windows of time with a respectively different spectral band and image data from the detection region is recorded with a light receiver having a plurality of light reception pixels in recording windows of time. Image data are recorded with a first line of light reception elements of the light receiver configured as a dual-line receiver are recorded in different recording windows of time and in this way during the illumination in at least one other spectral band for a second line of light reception elements of the light receiver.

The method in accordance with the invention can be further developed in a similar way and in this regard shows similar advantages. Such advantageous features are described by way of example, but not conclusively in the dependent claims dependent on the independent claim.

Figure 2:
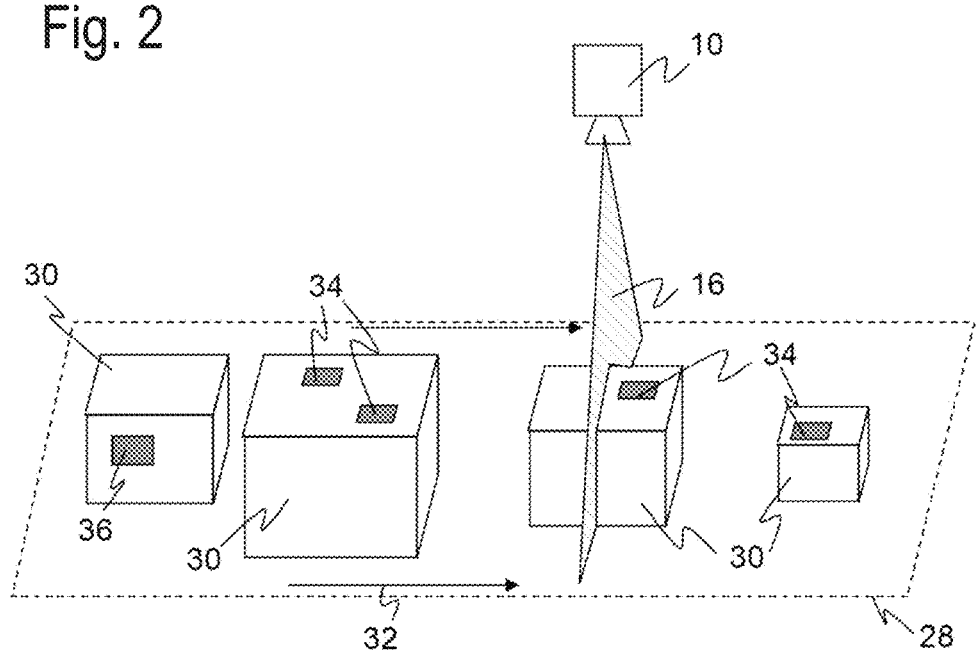
Figure 3:
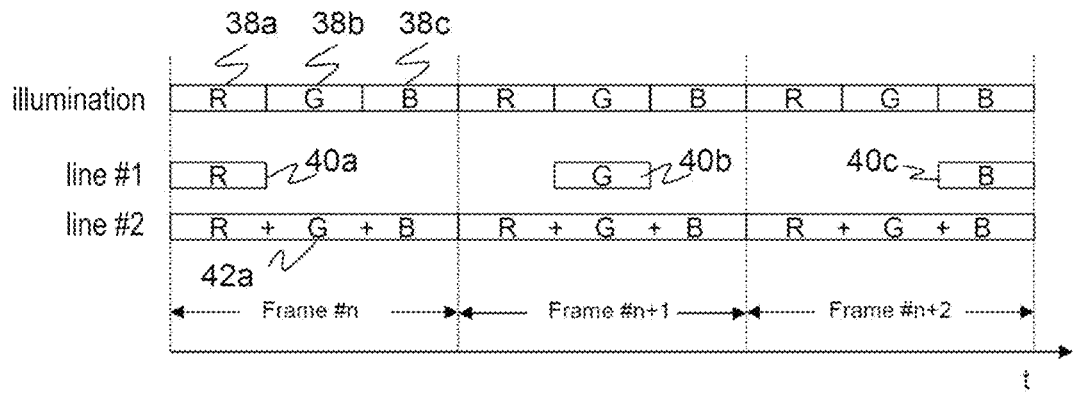
Figure 4:
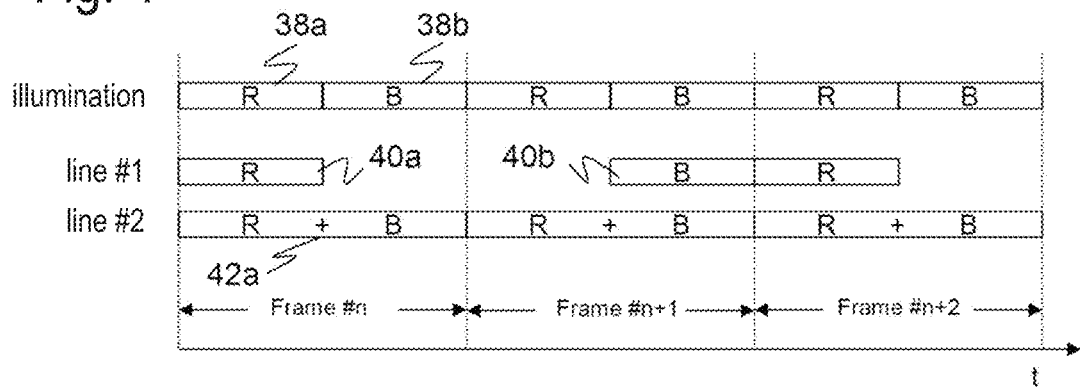
Figure 5:
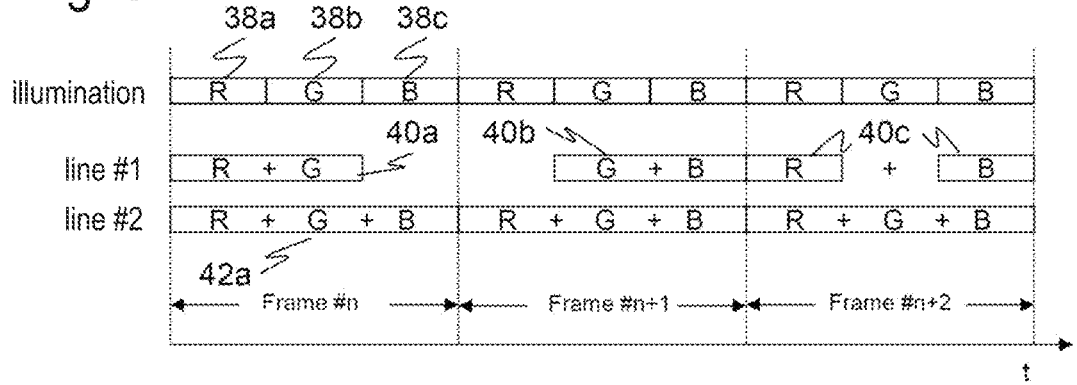
Figure 6:
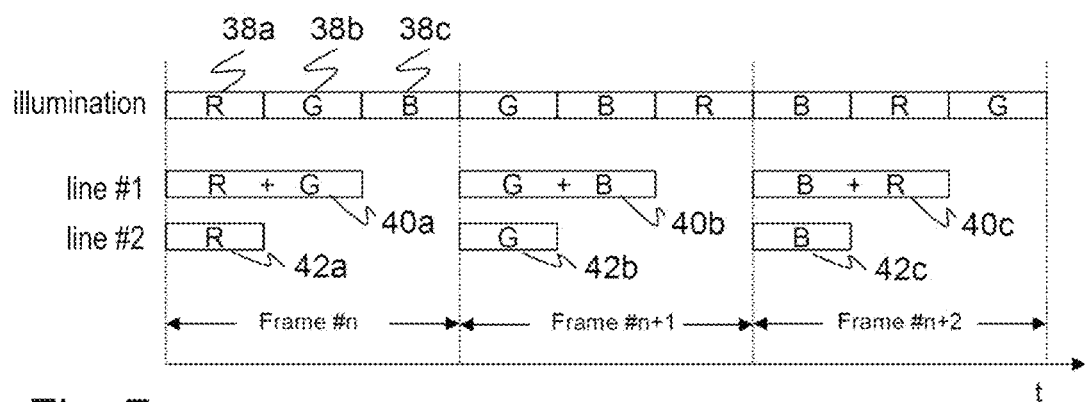
Figure 7:
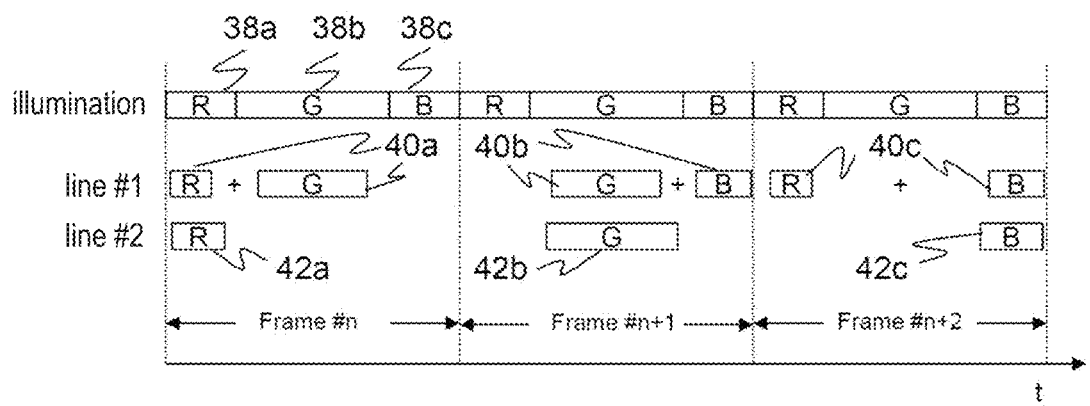

The invention will be described in detail also with regard to further features and advantages by way of example with reference to embodiments and with respect to the submitted drawing. The images of the drawing show in FIG. 1 a block illustration of a camera with multispectral illumination;

FIG. 2 a schematic three-dimensional view of a camera mounted at a conveyor belt with objects to be detected;

FIG. 3 a schematic illustration of the sequence in time of illumination windows of time and recording windows of time for a recording in three color channels having the first line and integrated over the three colors with the second line of a dual line receiver;

FIG. 4 a schematic illustration like FIG. 3, but with two instead of three colors;

FIG. 5 a schematic illustration like FIG. 3, but with a recording of color channels combined from two colors in the first line;

FIG. 6 a schematic illustration like FIG. 3, but with changed sequence of the colors by means of which it is illuminated, a recording in three color channels with the first line and a recording with color channels combined from two colors in the second line; and FIG. 7 an illustration like FIG. 3, but with variable length of the illumination window of time and recording window of time, as well as a recording in three color channels with the first line and a recording with color channels combined from two colors in the second line.

FIG. 1 shows a very simplified block illustration of a camera 10 which can, for example, be used for the measurement or inspection of objects, as well as for the detection of codes and the reading of their content. The camera 10 generates transmission light 14 with an illumination unit 12 in order to illuminate a detection region 16. A non-shown transmission optics can adapt the illumination field, in particular line-wise and the illumination unit 12 can also be external in a deviation from the illustration.

The illumination unit 12 has three, generally a plurality of light sources 12a-c with different spectral bands. By means of activation of individual or of a plurality of light sources 12a-c transmission light 14 with switchable spectral behavior can be generated in this way. In particular LEDs are suitable as light sources 12a-c. In this respect a few color variants are plausible, this means generated spectral bands; UV-A, for example for the reading of fluorescent ink, one or more visible colors such as red, green, blue or combinations red-blue, blue-white, as well as infrared in the sub-variants NIR (near infrared, approximately 780-1400 nm), SWIR (short-wave infrared, approximately 1400-3000 nm) or both. Colored objects reflect a higher grey scale specifically in the NIR range. As the examples show the term spectral band is to be understood broad and means the determination of spectral properties. The spectral band can be so broad as the complete visible light and also have a plurality of peaks, for example, for two primary colors. Instead of different light sources also only one light source or a plurality of like light sources can be used, wherein then a variable color filter, such as a filter wheel or a switchable color LCD is arranged in front thereof.

The camera 10 detects the reception light 18 from the detection region 16 through a recording objective 20 which in this example is represented by a single lens. A light receiver 22 in the form of a dual line receiver having two lines 22a-b of light sensitive reception signals generates image data of the detection region 16 and of the objects and code regions possibly present there. The reception pixel of the two lines 22a-b are preferably identical with respect to one another in this way like image data can be generated. Alternatively also differences are plausible, for example different pixel sizes and in this way higher sensitivities in the one line 22a-b and higher spatial resolution in the other line 22b-a.

The image data is read out by an evaluation unit 24. In this connection the evaluation unit also performs control tasks, including the switching of the illumination unit 12. The evaluation unit 24 is implemented on one or more digital components, for example microprocessors, ASICs, FPGAs or the like which can also be provided completely or partially outside of the camera 10. A preferred evaluation consists therein of stringing together detected image lines to an overall image. Otherwise the image data could be filtered, smoothed, normalized in its brightness, be cropped to certain regions or binarized in a preparatory manner on the evaluation. Then, for example, structures of interest are recognized and segmented, such as individual objects, lines or code regions. The structures can be measured or checked with respect to certain properties. In as far as codes should be read these are identified and decoded, this means the information included in a code is read out.

Data can be output at an interface 26 of the camera 10 and indeed both evaluation results, such as read code information or determined dimensions and results of inspection, as well as also data in different processing stages, such as raw image data, preprocessed image data, identified objects or not yet decoded code image data. Vice versa, it is possible to parameterize the camera 10 via the interface 26.

FIG. 2 shows a possible application of the camera 10 assembled at a conveyor belt 28 which conveys objects 30, as indicated by the arrow 32, through the detection region 16 of the camera 10. The objects 30 can have a code region 34 at their outer surfaces. It is a task of the camera 10 to detect properties of the objects 30 and to recognize the code regions 34 in a preferred use as a code reader, to read out the codes attached there, to decode the codes and to respectively associate these with the associated object 30. In order to recognize the laterally attached code regions 36 a plurality of cameras 10 are preferably used from different perspectives.

The detection region 16 of the camera 10 is a plane with a line-shaped reading field corresponding to the dual line assembly of the light receiver 22. The two lines 22a-b in this respect lie so close to one another that they practically detect the same object section. In that the objects 30 are recorded line-wise in the conveying direction 32 an overall image of the objects conveyed passed including the code regions 34 arises bit by bit.

In order to now be able to detect colored object structures, and in particular code regions 34 in front of colored objects 30 with a high contrast the illumination unit 12 is operated with alternating spectral bands and image data are respectively recorded at certain illuminations with the lines 22a-b in a targeted manner. For this purpose the illumination windows of time of the illumination unit 12 and the recording windows of time of the lines 22a-b of the light receivers are tuned with respect to one another, as will now be explained with reference to a plurality of examples on reference to the FIGS. 3-7.

In FIG. 3 the illumination unit 12 changes the spectral bands of the transmission light 14 cyclically. This can take place in a pulsed mode of operation. The lines 22a-b can be illuminated more frequently than is required for the image recording of the moved objects 30 (over-sampling). In other words the time interval predefined by the frame rate is large enough that the illumination can change there between and a receiving light 18 can be detected a multiple of times by the light receiver 22.

In the example of FIG. 3 uniform illumination windows of time 38a-c result. The detection region 16 is alternatingly illuminated red, green and blue. For the first line 22a recording windows of time 40a-c are respectively predefined within exactly one illumination window of time 38a-c and indeed cyclically with the frame change with a different offset. Thus, after three frames, image data is recorded once respectively during red, green and blue illumination. This enables a separation into color channels without the use of color filters such as a Bayer pattern.

In contrast to this recording windows of time 42a are pre-defined for the second line 22b which reach over the illumination with all three colors. In this way a light and contrast stark grey scale recording results in the overall visible spectrum. In contrast to the illustration, pauses are intermittently plausible at the transmission side and the reception side.

On the one hand, image data of the first line 22a with the three color channels is made available for the evaluation unit 24 which, however, have a certain shift in time. When the shift in time interferes, as the objects move too fast, illumination windows of time 38a-c or recording windows of time 40a-c can be varied in such a way that only one color channel is recorded. The grey values of the second line 22b are made available in any case without shift in time with respect to the image data recorded in one color of the first line 22a. In this way additional features are made available in order to recognize the object properties or to read codes.

FIG. 4 shows a variant of the example in accordance with FIG. 3 having two rather than three colors. The illustrated combination red-blue is particularly advantageous as it includes complementary contrasts can, however, also be replaced by different combinations. In any way colors are only to be understood by way of example within the visible spectrum, such as in the FIGS. 3 and 4. Likewise, combinations with non-visible spectral bands are possible. Thus, in analogy to FIG. 3, a change between ultraviolet, visible and infrared can take place or in analogy to FIG. 4, a change from visible and infrared. Also embodiments with more than three spectral bands are possible.

FIG. 5 shows a further example in which the recording windows of time 40a-c of the first line 22a extend over two illumination windows of time 38a-c. This, on the one hand, already results in a further variant. In combination with the recording of grey values over all colors via the second line 22b by means of subtraction of the image data of the first line 22a from the image data of the second line 22b also the respective complementary primary color can be reconstructed (this means RGB−RG=B, RGB−GB=R and RGB−RB=G).

In the frame n+2 illustrated on the right hand side of the FIG. 5 the recording window of time 40c is divided into two parts. To avoid this is an advantage of a further embodiment in accordance with FIG. 6. In this respect the illumination unit 12 no longer regularly tunes all colors red, green and blue, but a permutation of the sequences in itself takes place cyclically with each frame in such a way that the sequence of the spectral bands or colors is only repeated cyclically after three frames or after nine changes of color.

This, on the one hand, has the advantage that a frame exists for each color in which the illumination starts with this phase with a certain offset. Thus, it is possible to fix the recording windows of time 40a-c, 42a-c within the frames and to still utilize the different spectral bands. This enables a regular processing, as no shift in time results with respect to the frames. Moreover, the recording windows of time 42a-c can respectively be selected via two colors without one of these having to be divided into two. In the example of FIG. 6 the recording windows of time 40a-c of the first line 22a is respectively placed directly at the start of the frame and through the permutation of the illumination window of time 38a-c still detect image data in all three color channels. The recording windows of time 42a-c likewise lie at the start of the frames and detect all combinations of two colors such as in the embodiment in accordance with FIG. 5, without a division into two.

FIG. 7 illustrates a further example in which the illumination windows of time 38a-b and the recording windows of time 40a-c, 42a-c are varied in their length in dependence on the spectral band. In analogy to a Bayer pattern green is illuminated longer and recorded for longer than red or blue. Moreover, the recording windows of time 40a-c, 42a-c have an individual variation in position and length which can compensate performance differences of the light sources 12a-c or different spectral sensitivities of the light reception elements of the light receiver 22 just like individual differences of the associated components. In this way, in particular a camera amplification and a signal to noise ratio can be maintained constant. In order to illustrate, that the different embodiments in accordance with FIGS. 3 to 7 can also be advantageously combined, a recording is respectively carried out in this example in the first line 22a for one color and in the second line 22b for two colors. The already mentioned variations with recordings for all colors and more or less different spectral bands are also plausible in this example, just as is an adaptation of the sequence of the colors, in order to avoid the two-fold divided recording windows of time 40a-c, 42a-c at least partly shown in FIG. 7.

In order to carry out individual brightness adaptations like in FIG. 7, it is plausible to equip the camera 10 with a non-illustrated spectrometer which is integrated into the camera 10 or can also be connected as an external module. In this way the intensities of transmission light 14 and reception light 18 can be dynamically determined. Alternatively, these intensities are determined independently, for example, with a separate spectrometer, which is then, however, only possible for the installation and maintenance, but no longer dynamically. Indeed the light sources 12a-c are preferably spectrally and thermally stable, but insofar as this is not specifically achievable in the pulsed mode of operation due to thermal effects and non-linear characteristics, such an adaptation can be used for the compensation of drifts and the color stability can be controlled. By means of the data obtained through the spectrometer also amplification factors or recording windows of time 40a-c, 42a-c can be adapted for example on changes due to replacement parts, changed objects, a changed background or a change in conveyor belt colors.

What is claimed:

1. A camera for the detection of objects in a detection region, the camera comprising a light receiver having a plurality of light reception pixels, a multispectral illumination unit for illuminating the detection region in different spectral bands and an evaluation unit that is configured to illuminate the detection region by means of the illumination unit during different illumination windows of time with a respectively different spectral band and to record image data from the detection region with the light receiver in recording windows of time,
    wherein the light receiver is configured as a dual line receiver having a first line of light reception pixels and a second line of light reception pixels and in that the recording window of time for the first line is different from that for the second line.
2. The camera in accordance with claim 1,
    wherein the illumination unit is configured for the illumination in at least two of the following spectral bands: red, green, blue, visible, infrared, ultraviolet.
3. The camera in accordance with claim 1,
    wherein the evaluation unit is configured to cyclically change the spectral band of the illumination unit.
4. The camera in accordance with claim 3,
    wherein the evaluation unit is configured to permutate the sequence of the spectral bands generated by the illumination unit in at least a few cycles.
5. The camera in accordance with claim 1,
    wherein the evaluation unit is configured to determine the recording window of time for at least one line respectively within an illumination window of time in such a way that a recording in each case takes place during the illumination with only one spectral band.
6. The camera in accordance with claim 5,
    wherein the evaluation unit is configured to determine the recording window of time for the other line in such a way that a recording respectively takes place during the illumination with all spectral bands.
7. The camera in accordance with claim 1,
    wherein the evaluation unit is configured to determine the recording window of time for at least one line respectively via two illumination windows of time in such a way that a recording respectively takes place during the illumination initially with one and then with a different spectral band.
8. The camera in accordance with claim 7,
    wherein the evaluation unit is configured to determine the recording window of time for the other line in such a way that a recording respectively takes place during the illumination with all spectral bands.
9. The camera in accordance with claim 1,
    wherein the evaluation unit is configured to add image data of the two lines to one another or to subtract image data of the two lines from one another.
10. The camera in accordance with claim 1,
    wherein the evaluation unit is configured to adapt the length of the illumination window of time and/or of the recording window of time in dependence on the spectral sensitivity of the light receiver for the respectively detected spectral bands.
11. The camera in accordance with claim 1,
    that comprises a spectrometer unit in order to measure the intensity of the transmitted or received light in the spectral bands, wherein the evaluation unit is configured to adapt a transmission power, a receiver amplification, the length of the illumination window of time and/or the length of the recording window of time in dependence on the measured intensity.
12. The camera in accordance with claim 1,
    that is a camera-based code reader whose evaluation unit is configured for the detection and reading out of codes from the image data.
13. A method for the detection of objects in a detection region, in which the
    detection region is illuminated during different illumination windows of time with a respectively different spectral band and image data from the detection region is recorded with a light receiver having a plurality of light reception pixels in recording windows of time,
    wherein image data are recorded with a first line of light reception elements of the light receiver configured as a dual-line receiver are recorded in different recording windows of time and in this way during the illumination in at least one other spectral band for a second line of light reception elements of the light receiver.

* * * * *